Feb. 7, 1950     F. R. CHESTER     2,496,268
ADJUSTABLE MEASURING RECEPTACLE
Filed March 14, 1945
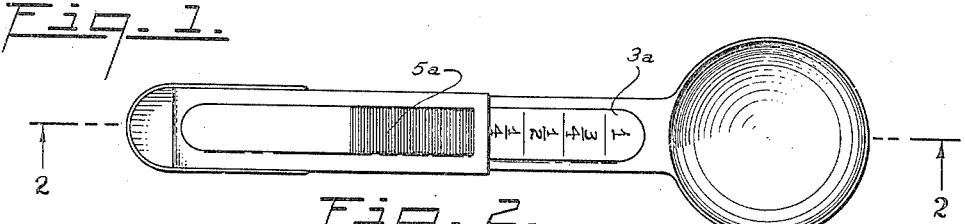
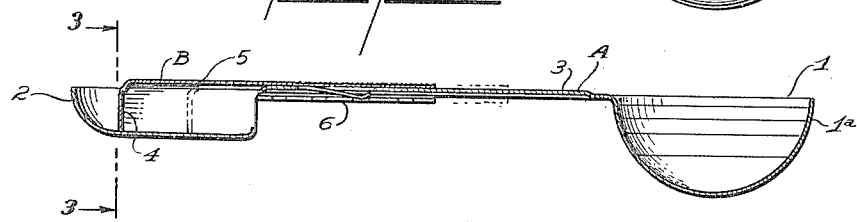
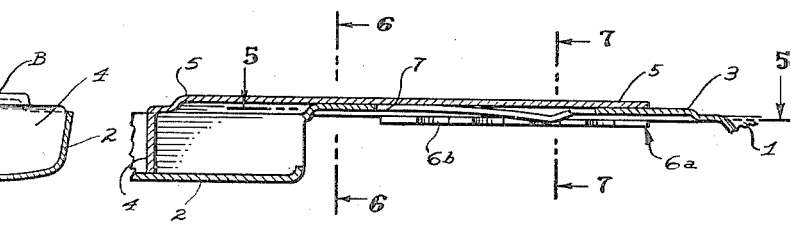
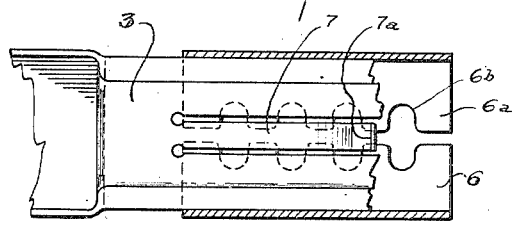
Inventor
F. R. Chester
By William B. Hall
Attorney Patented Feb. 7, 1950

2,496,268

UNITED STATES PATENT OFFICE 2,496,268

ADJUSTABLE MEASURING RECEPTACLE

Frank R. Chester, Santa Monica, Calif.

Application March 14, 1945, Serial No. 582,725

2 Claims. (Cl. 73—429)

My present invention relates to a measuring device.

An important object of this invention is to provide a device of this class whereby varying small quantities of liquids and powdered or granular substances may be readily measured.

Another important object of this invention is to provide an article of this class which resembles an ordinary spoon, which may be manipulated as readily as an ordinary spoon, and which may be designed to measure teaspoonfuls, tablespoonfuls, or fractions of either.

An important object also of this invention is to provide a novel arrangement of elements which may be readily adjusted for measuring varying quantities of substances.

A further important object of this invention is to provide novel and simple means of positively determining the adjustment of the device for measuring varying quantities.

A still further important object of this invention is to provide an article of this class which may be readily and economically fabricated of only two parts.

With these and other objects in view, as will appear hereinafter, I have devised a measuring device having certain novel features of construction, combination, and arrangement of parts and portions, as will be hereafter described in detail and particularly set forth in the appended claims, reference being had to the accompanying drawings, and to the characters of reference thereon, which form a part of this application, in which:

Fig. 1 is a top view of my measuring device in a preferred form.

Fig. 2 is a longitudinal sectional view thereof, taken through 2—2 of Fig. 1, and showing by dotted lines one of the members in a shifted position;

Fig. 3 is an enlarged, transverse sectional view thereof, taken through 3—3 of Fig. 2;

Fig. 4 is an enlarged fragmentary sectional view thereof, similar to the middle portion of Fig. 2, showing primarily the means for determining the adjusted positions of the device;

Fig. 5 is a fragmentary longitudinal sectional view thereof, taken through 5—5 of Fig. 4; and, Figs. 6 and 7 are transverse sectional views thereof, taken respectively through 6—6 and 7—7 of Fig. 4.

As shown in the drawings, my device consists of only two members, namely a receptacle member A and a capacity adjusting member B.

The member A consists of measuring receptacles 1 and 2 which are connected by a handle 3, the receptacles being positioned at and secured to the opposite ends of the handle.

The receptacle 1 is made in the form of a hemispherical bowl of the capacity of approximately one tablespoonful. It is provided at its interior with a number of circles 1ª or arcuate marks which are adapted to designate various portions or fractions of a tablespoon.

The receptacle 2 is preferably of a smaller capacity, and may be of the teaspoonful size. It is elongated and is secured at one end to the handle 3. It is of uniform transverse cross-section, shown in Fig. 3.

The capacity of the receptacle 2 is variable and is capable of being readily varied by a longitudinally movable wall or stop 4 which extends into the receptacle 2 from the top and is positioned at one end of the member B. The larger portion of the member B consists of a shank 5. The end of the shank which is slidably positioned over the handle 3, opposite the stop 4 is provided with a loop portion 6, which embraces the handle 3, and is provided, at the opposite edges of the upper plate portion or web, with flanges 6ª which are bent against the under side of the handle 3. The shank 5 is designed to ride upon the upper side of the handle 3 and also to cover the space of the receptacle 2 between the rear end thereof and the stop or flange 4, as shown in Figs. 1, 2 and 4.

For the purpose of strength, both the handle 3 and the shank 5 are upwardly ridged, as shown best in Figs. 5 and 6. Such construction also facilitates guiding of the member B with respect to the member A.

The shank 5 is provided with a knurled or serrated portion 5ª at the rear end so that when the article is gripped with the hand around the handle 3, with the palm towards the receptacle 1, the member B may be shifted outwardly or drawn inwardly by means of the thumb of the hand which holds the article.

On the raised or ridged portion of the handle 3, indicated by 3ª, there are shown graduations ranging from one-fourth to one (¼ to 1) which are intended to designate units of measure from one-fourth to one teaspoonful. The rear end of the shank 5 of the member B is the index, which, when the member B is shifted backwardly, indicates the capacity of the receptacle 2 in front of the stop, flange, or wall 4. The dotted lines in Fig. 2 designate shifted positions of the member B.

As shown best in Figs. 4, 5 and 7 the ridged portion of the handle 3 has a longitudinally extending leaf spring 7 extending backwardly, and the rear or free end has a transversely ridged dog or pawl portion 7ª which resiliently engages the upper sides of both flanges 6ª. Thus, the upper plate portion, or web of the member B is forced downwardly or against the member A. The flanges 6ª also have depressions or holes 6ᵇ formed by opposed notches in the edges of the flanges 6ª. The flanges 6ª have a series, preferably four (4) of them, for receiving the end 7ª of the pawl for more or less positively locating the stop 4 in the various or desired measuring positions.

It will be here noted that in the foremost position of the member B a small receptacle is provided, thus determining at all events the smallest unit of measure, which in this instance is one-fourth teaspoonful. The subsequent rearward or withdrawn positions of the member B, determined positively as described above, adds another one-fourth teaspoonful, and so forth, until the member B is shifted to its farthest position. This is here shown as determining one whole teaspoonful in the receptacle 3.

Though I have shown and described a particular construction, combination and arrangement of parts and portions, I do not wish to be limited to the same, but desire to include in the scope of my invention the construction, combination, and arrangement substantially as set forth in the appended claims.

I claim:

1. In a device of the class described, an elongated open top receptacle having a handle extending from the upper portion of one end and positioned in alignment with the receptacle, and a stop having a shank, said shank being folded from the upper side to the bottom side of the handle and slidably mounted thereon, the stop extending downwardly from the shank into and conforming with the sides of the receptacle, the portion of said shank folded under the handle being provided with longitudinally spaced recesses, and said handle having a resilient finger extending longitudinally with respect thereto and secured at the end nearest the receptable to said handle, the free end of the finger having a pawl portion adapted to enter one of the recesses.

2. In a device of the class described, an elongated open top receptacle having a handle extending from the upper portion of one end and positioned in alignment with the receptacle, and a stop having a shank, said shank being folded from the upper side to the bottom side of the handle and slidably mounted thereon, the stop extending downwardly from the shank into and conforming with the sides of the receptacle, the portion of said shank folded under the handle being provided with longitudinally spaced recesses, and said handle having a resilient finger extending longitudinally with respect thereto, the free end of the finger having a pawl portion adapted to enter one of the recesses.

FRANK R. CHESTER.

REFERENCES CITED

The following references are of record in the file of this patent:

UNITED STATES PATENTS

| Number | Name | Date |
| --- | --- | --- |
| 808,967 | Arrowsmith | Jan. 2, 1906 |
| 1,324,264 | Parent | Dec. 9, 1919 |
| 2,034,733 | Wilkins | Mar. 24, 1936 |
| 2,165,642 | Mayer | July 11, 1939 |
| 2,259,504 | Wilson | Oct. 21, 1941 |
| 2,396,943 | Frank | Mar. 19, 1946 |